3,476,296
Patented Nov. 4, 1969

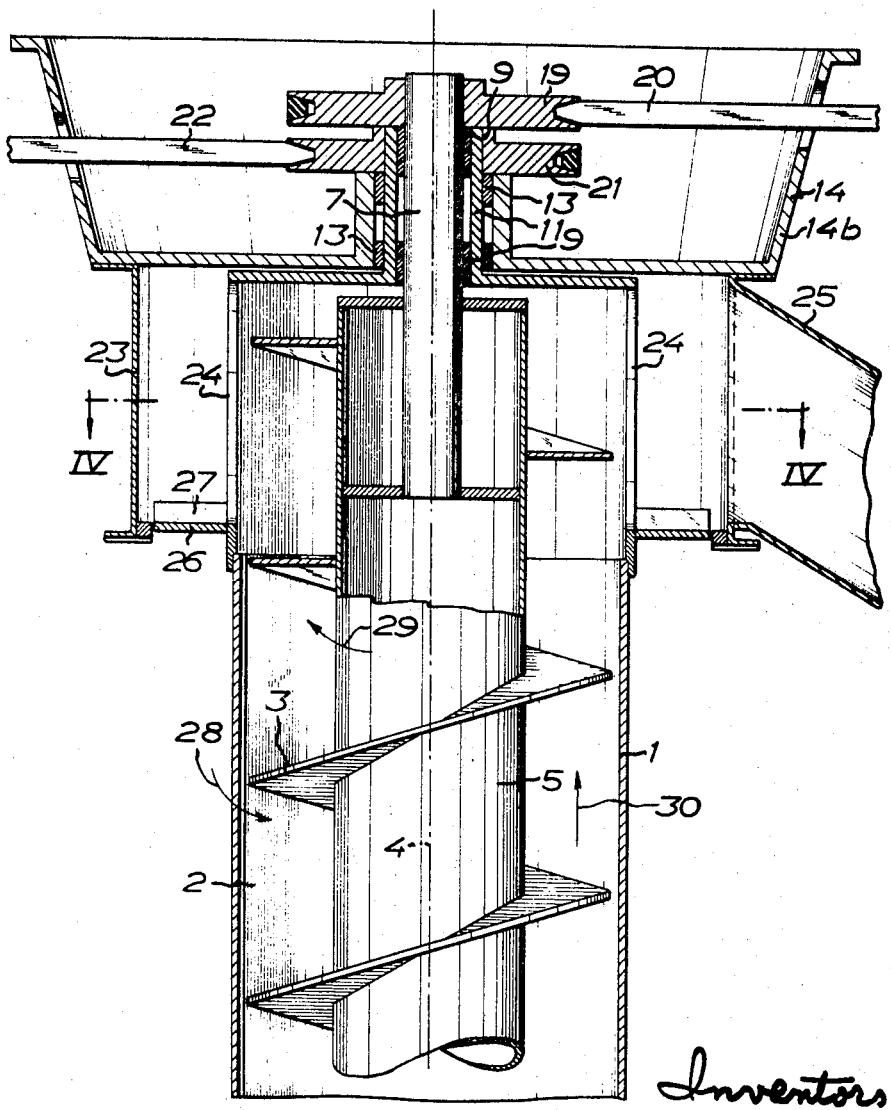

3,476,296
CONVEYING APPARATUSES
Olle Lennart Siwersson, Gartnergatan 4, and Karl Gunnar Tell, Malmogatan 3, both of Halsingborg, Sweden
Filed July 18, 1967, Ser. No. 654,118
Claims priority, application Sweden, July 20, 1966, 9,887/66
Int. Cl. B65g *33/20;* G01f *11/20*
U.S. Cl. 222—381   3 Claims

ABSTRACT OF THE DISCLOSURE

A conveying apparatus with rotatable conveying elements in the form of a screw and a tubular housing for said screw, at least one of said conveying elements rotating at such speed that the conveyed material is deposited, under the action of centrifugal force, as a layer on the inner surface of the housing, and the other conveying element rotates at a speed corresponding to or approximately corresponding to the speed of said first-mentioned conveying element.

---

This invention relates to a conveying apparatus with conveying elements in the form of a screw and a tubular housing for said screw, said conveying elements being rotatable about the same geometrical axis for conveying material in the longitudinal direction of said axis and in consequence hereof in the longitudinal direction of said screw and said housing.

It is previously known in screw conveyors for vertical conveyance to cause the housing to rotate and to maintain the screw stationary. The housing is rotated at such speed that the conveyed material under the action of centrifugal forces is thrown against the wall of the rotating housing and moved upwardly by means of the stationary screw. Owing to the heavy braking effect of the screw on the conveyed material, the efficiency of these devices is low.

It is also known in a screw conveyor for substantially horizontal conveyance of material tending to adhere to the inner surface of the housing, to free the housing from such adhering material by intermittently or continuously causing the housing to rotate slowly in relation to the screw which also rotates slowly. The efficiency of this conveying apparatus is equally low as the efficiency of conventional screw conveyors, and the fact that with some types of material this low efficiency has not further decreased is entirely due to the cleaning effect of the slowly rotating housing.

The invention resides in the combination that one conveying element is adapted to be rotated about the axis of rotation at such a speed that the conveyed material by centrifugal action is thrown against and deposited as a layer on the housing surface facing the screw, and the other conveying element is adapted to be rotated about the axis of rotation at a speed corresponding or approximately corresponding to the speed of said first-mentioned conveying element. By suitable selection of the direction of the screw thread, the thread pitch and the directions of rotation of the screw and the housing, it is made possible by the invention, with less power required, to obtain an efficiency of up to 70%, which in most cases is approximately three times as much as the efficiency hitherto attainable with known screw conveyors.

The invention will now be described in the following with reference to the accompanying drawings, in which:

FIGURE 3 is a longitudinal section through the discharge end of the conveying apparatus;

Figure 1:
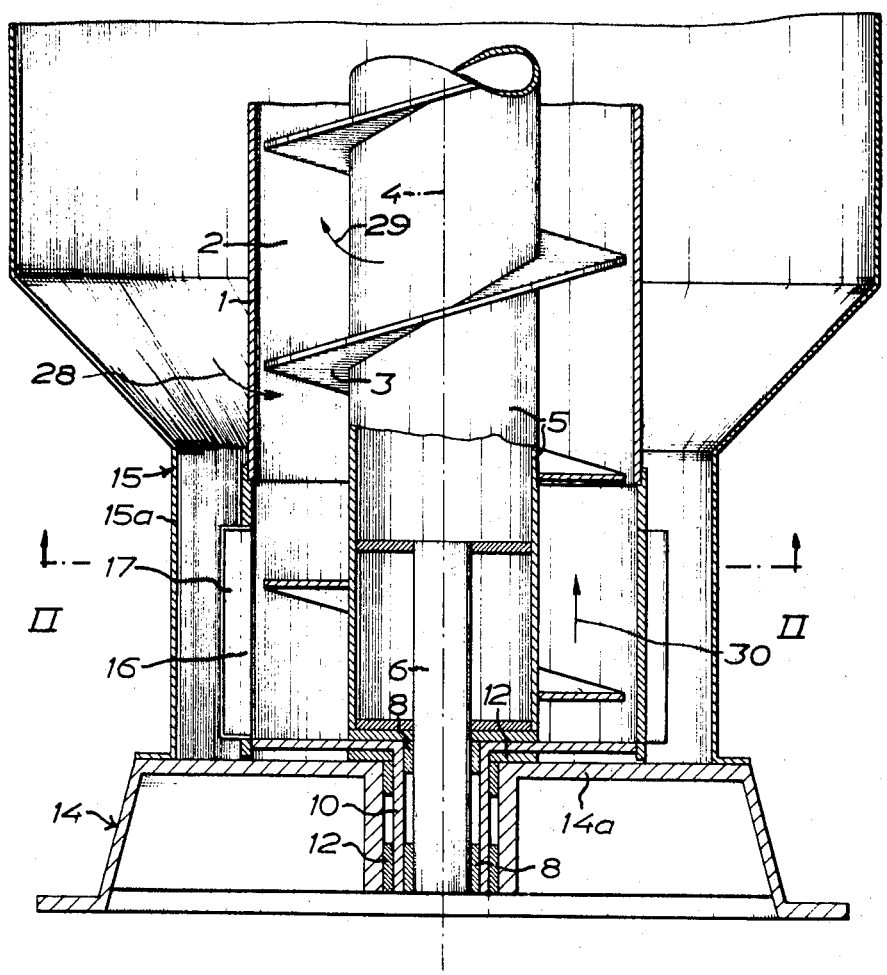
FIGURE 1 is a longitudinal section of a conveying apparatus according to the invention taken through the feed end of the apparatus.
Figure 2:
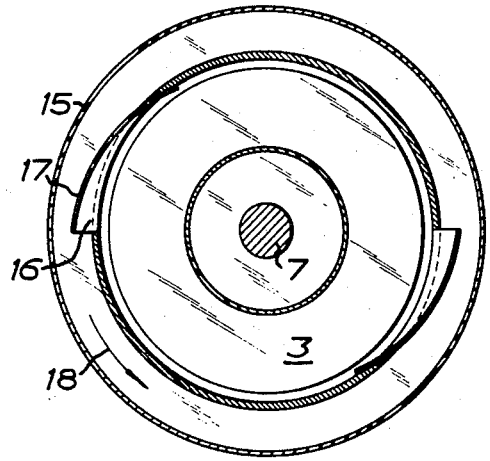
FIGURE 2 is a cross section along line II—II in FIGURE 1.
Figure 4:
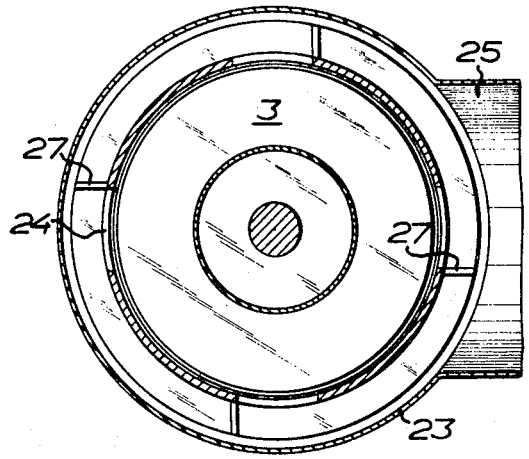
FIGURE 4 is a cross section along line IV—IV in FIGURE 3.

The conveying apparatus shown in the drawings consists of a conveying passage 2 defined by a housing 1, and a screw 3 extending through said passage. An axis of rotation extending in the longitudinal direction of the housing 1 and the screw 3 is indicated by a dash-and-dot line and is designated 4. The screw 3 has a core 5 constituted by a tube which at both ends is provided with a bearing journal 6 and 7, respectively, mounted in bearings 8 and 9 which are provided in the sleeve-like ends 10 and 11, respectively, of the housing 1. The sleeve-like ends 10 and 11 of the housing 1 are mounted in bearings 12 and 13, respectively, in a but partly shown stand, one part 14a of which accommodates the bearing 12, while the bearing 13 is mounted in the other part 14b of said stand. Also mounted in the stand part 14a is a hopper 15 extending upwardly around the housing 1, and the narrow portion 15a of said hopper is arranged in the region of entrance openings 16 provided in the housing 1, each opening 16 being partly defined by a bucket 17 secured to the housing 1. During rotation of the housing 1 and the buckets 17 in the direction indicated by arrow 18 in FIGURE 2, the buckets 17 will feed loose material (not shown) into the lower part of the conveying passage 2, which material is supplied in arbitrary manner to the hopper 15 through the passage 2 and is conveyed to the upper part of the housing 1.

Attached to the bearing journal 7 is a V-belt pulley 19 which is driven by a V-belt 20. On the sleeve-like end 11 there is also atached a V-belt pulley 21 which is driven by a V-belt 22. Thus, both the housing 1 and the screw 3 can be rotated in opposite directions about the axis of rotation 4. From the underside of the stand part 14b a casing 23 extends downwardly around the upper part of the housing 1 which is provided with discharge openings 24. The casing 23 is provided with a discharge passage 25. Below the respective discharge openings 24 the housing 1 has a radial flange 26 which on its side facing the discharge opening 24 has a substantially radial wall 27 which is provided adjacent the opening 24 and which, during rotation of the housing 1 in relation to he stationary casing 23 carries along material leaving the opening 24 and contributes to the transfer of this material and its discharge through the passage 25.

When the above described conveying apparatus is put into operation and the housing 1 and the screw 3 are rotated—the housing 1 in the direction of arrow 28 and the screw 3 in the direction of arrow 29—the conveying passage 2 is quickly filled with material which by the centrifugal action caused by the rotation of the housing and the screw is thrown against the housing surface which faces the screw, on which surface the conveyed material is deposited as a layer which extends from the housing 1 to the core 5 and is quickly conveyed in the direction of arrow 30 and eventually leaves through the passage 25.

Tests made with a conveying apparatus according to the invention result in the valve given in the following table. The screw used for these tests had an outer diameter of 86 mm. and a pitch of 80 mm. The inner diameter of the tube was 96 mm.

| | Filling effect, percent | Screw speed, r.p.m. | Tube speed, r.p.m. | Tube plus screw speed, r.p.m. | Capacity liter per min. | Capacity at 1,000 r.p.m. liter per min. |
|---|---|---|---|---|---|---|
| (1) Screw alone rotates | 15 | 500 | 0 | | 30 | 60 |
| (2) Housing alone rotates | 40 | 0 | 500 | | 85 | 179 |
| (3) Both screw and housing rotate | 70 | 500 | 500 | 1,000 | 295 | 290 |
| (4) Both screw and housing rotate | 55 | 600 | 500 | 1,100 | 230 | 205 |
| (5) Both screw and housing rotate | 63 | 400 | 500 | 900 | 225 | 250 |
| (6) Screw alone plus housing alone | 27 | | | 1,000 | 115 | 115 |

During run No. 1 only the screw was rotated and during run No. 2 only the housing, both at 500 r.p.m. During run No. 1, the capacity was 30 liters per min. and during run No. 2 it was 85 liters per min. During run No. 3 both the housing 1 and the screw 3 were rotated, each with a speed of 500 r.p.m. In the last-mentioned instance, a capacity of 295 liters per min. was obtained. The table also shows the result of runs where the screw 3 had a speed of 66 r.p.m. (run No. 4) and a speed of 400 r.p.m. (run No. 5). During both runs, the speed of the housing was 500 r.p.m. If, in accordance with the last line of the table in run No. 6, the results obtained with these runs are compiled and compared with each other, it will be found that if the results of runs Nos. 1 and 2 are added and the housing 1 and the screw 3 have a combined speed of 1,000 r.p.m., the total capacity will be 115 liters per min., a value to be expected if the housing 1 and the screw 3 are rotated simultaneously. Actually, however, if the housing is rotated at 500 r.p.m., as in run No. 2, and the screw is rotated at 500 r.p.m., as in run No. 1, the capacity will be 295 liters per min. which shows that an unexpected technical effect far beyond the total effect of the rotation of the housing 1 and the screw 3 is obtained.

Figure 5:
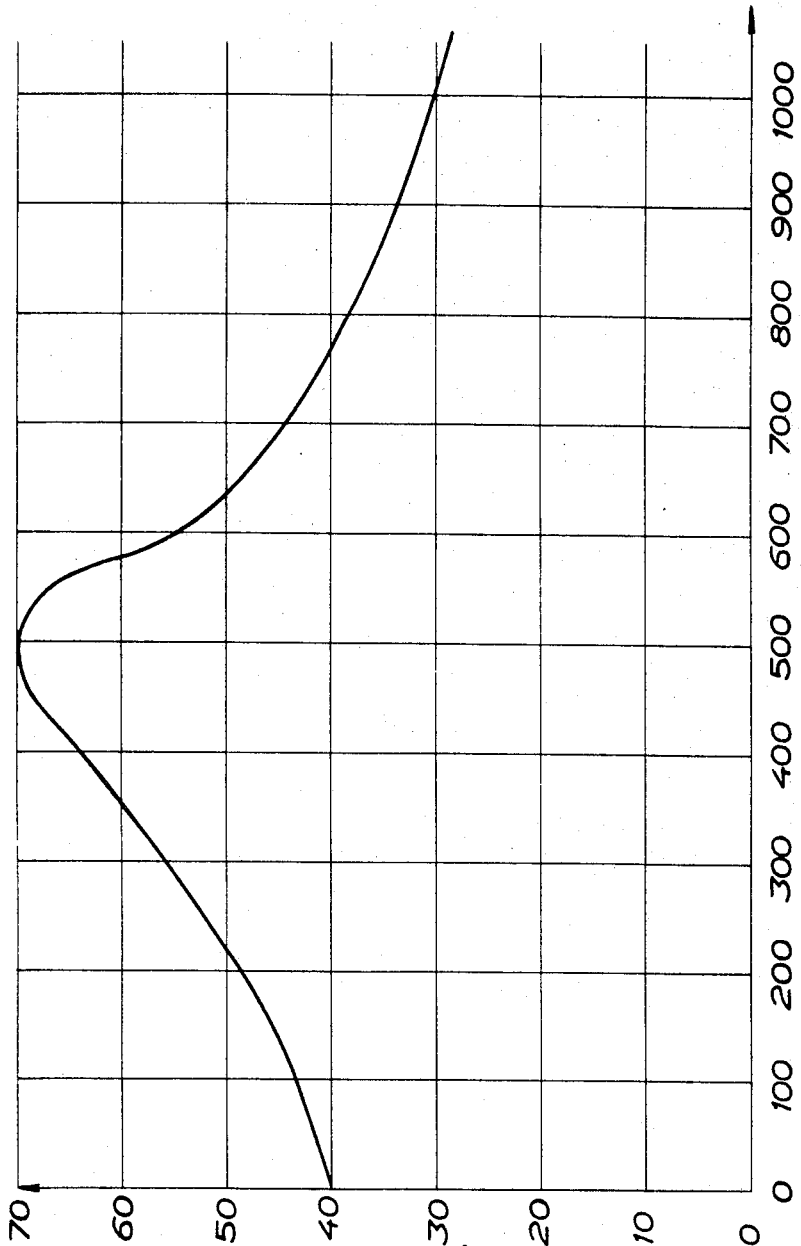
FIGURE 5 is a diagram.

FIGURE 5 shows how the filling effect at a constant housing speed of 500 r.p.m. and a lower but gradually increased screw speed quickly rises to 70% when the screw finally has reached the same speed as the housing, and then again rapidly decreases at higher and gradually increased screw speed. Thus, maximum capacity is obtained when the housing and the screw rotate at the same speed, and the speed is such that the conveyed material is deposited as a layer on the housing surface facing the screw. It has as yet not been possible fully to explain what causes the unexpectedly high efficiency of the conveying apparatus according to this invention.

The speed of the housing must be so selected in relation to the housing diameter that the frictional forces caused by the centrifugal action, on one hand in the conveyed material and, on the other hand, between the conveyed material and the housing, are greater than gravity. The speed required for a given conveying apparatus with a housing and a screw having a certain diameter, can be calcuated from the following formula $$n > \frac{60}{2\pi} \sqrt{\frac{g}{r\mu}}$$

in which:

$n$ = speed
$c$ = centrifugal force
$\mu$ = coefficient of friction
$m$ = mass
$g$ = gravity acceleration
$r$ = radius
$W$ = peripheral speed $$C = m \cdot r \cdot W^2$$

$$W = \frac{2\pi \cdot m}{60}$$

However, the apparatus also operates at lower speeds because of the support provided by the screw. For a more exact calculation of the speed, the screw pitch must therefore be taken into consideration. If a correction factor $k$ for the pitch and clearance losses is introduced into the above equaltion, the formula will appear as follows $$n > \frac{60}{2\pi} \cdot k \sqrt{\frac{g}{r\mu}}$$

If the speed of the housing used in the above tests is calculated on the basis of this formula, it will be seen that the unexpected technical effect of the invention is obtained approximately at a minimum speed of 135 r.p.m. for the housing and approximately the same speed for the screw.

A large screw pitch can be used since the conveyed material, because of the rotation of the conveying elements, will tend to rise vertically. Pitch angles of up to 45° have been tested successfully, resulting in higher capacity and less power required.

The detailed construction of the conveying apparatus and the speeds of the housing 1 and the screw 3 may be optionally chosen and determined by the material to be conveyed. The conveying apparatus illustrated in the drawings has vertical extension, an operative position which heretobefore was practically impossible for conventional screw conveyors. However, it is also possible to use the conveying apparatus of the invention in a more or less inclined position.

The position of the transmission and/or drive device in relation to the housing 1 and the screw 3 is of minor importance in the operation of the invention, and these devices may therefore be connected to the feed end instead of to the discharge end of the apparatus.

What we claim and desire to secure by Letters Patent is:

1. A conveying apparatus comprising, in combination, an elongated screw;
   means connected to said screw for rotating in one direction about its longitudinal axis;
   an elongated tubular housing extending axially of the entire length of said screw,
   means connected to tubular housing for rotating the housing in a direction opposite said screw and at the same rate of movement;
   said means for rotating said screw and housing being capable of centrifugally discharging material onto the inner surface of said housing whereby material moves as a continuous layer on the inner surface of said housing;
   a supply hopper surrounding a lower portion of said tubular housing;
   said housing including at least one lateral opening having a scoop portion opening in the direction toward which said housing is rotated.

2. A conveying apparatus as set forth in claim 1 in which the upper portion of said housing includes a chamber circumposed and communicating with the interior of said housing; and a discharge chute communicating with said chamber for conveying material away from said chamber.

3. A conveying apparatus as set forth in any one of claims 1 and 2 in which the speed of the housing is selected in relation to the housing diameter and frictional forces caused by centrifugal action, frictional forces between the conveyed material and housing, and the speed required for the conveying apparatus are calculated as follows:

$$n > \frac{60}{2\pi}\sqrt{\frac{g}{r\mu}}$$

in which:

- $n$ = speed
- $c$ = centrifugal force
- $\mu$ = coefficient of friction
- $m$ = mass
- $g$ = gravity acceleration
- $r$ = radius
- $W$ = peripheral speed $$C = m \cdot r \cdot w^2$$

$$W = \frac{2\pi \cdot m}{60}$$

and a correction factor $k$ according to support provided by the screw is introduced to compensate for pitch and clearance loses as follows:

$$n > \frac{60}{2\pi} \cdot k \sqrt{\frac{g}{r\mu}}$$

References Cited
UNITED STATES PATENTS

| | | |
|---|---|---|
| 2,043,409 | 6/1936 | Heitmann. |
| 2,545,141 | 3/1951 | Escher _____ 198—213 |
| 2,783,921 | 3/1957 | Stokland _____ 222—381 X |

EDWARD A. SROKA, Primary Examiner

U.S. Cl. X.R.

222—413; 198—213